Patented Mar. 28, 1950

2,502,030

UNITED STATES PATENT OFFICE 2,502,030

SOLUTIONS OF ACRYLONITRILE POLYMERS CONTAINING A COLOR-FREE ACIDIC COMPOUND

Robert Albert Scheiderbauer, Kenmore, N. Y., assignor to E. I. du Pont de Nemours & Company, Wilmington, Del., a corporation of Delaware No Drawing. Application July 13, 1945,
Serial No. 604,978

6 Claims. (Cl. 260—29.1)

This invention relates to the improvement of color characteristics of polymers and solutions and articles made therefrom and is particularly concerned with diminishing the color normally developed in solutions of acrylonitrile polymers.

Acrylonitrile polymers containing at least 85% of acrylonitrile in the polymer molecule are insoluble in ordinary organic solvents. It has been found however that dimethyl formamide serves as a useful solvent medium for said difficultly soluble polymers. The solution of the said polymers in dimethyl formamide is normally effected by the use of heat and, furthermore, in forming shaped articles, particularly filaments, yarns and films, from the solutions of said polymers in dimethyl formamide, heating is usually resorted to in order to obtain the proper solution characteristics, e. g. the proper viscosity and homogeneity. Where heat is resorted to either to form the solution of the polymer or in the manufacture of shaped articles from such solutions, a yellow or brownish-yellow color is frequently developed in the solution and transmitted to the shaped article formed therefrom.

While the exact mechanism which causes this color formation has not been determined with certainty, it is believed that the dimethyl formamide obtainable from commercial sources contains certain organic amines, particularly dimethylamine, which appear to react with the polymer, particularly at elevated temperatures, to form products which impart undesirable color to the polymer solutions. The heating of dimethyl formamide during the formation of the solution of said polymers and also the subsequent heating of the solution just prior to converting it into articles such as filaments, yarns and films may cause the formation of additional compounds such as amines which, like the amines present as impurities in dimethyl formamide, impart an undesirable degree of color to the polymer solutions and to products produced from these solutions.

It is an object of the present invention to minimize color formation in polymer compositions. A further object pertains to color diminution in polymer compositions which develop color with the passage of time, particularly when solutions of the polymers are permitted to stand for a prolonged period of time or at elevated temperatures. A still further object relates to the prevention of undesirable color formation in polymer compositions containing organic amines. A further object of the invention is concerned with the diminution of color in solutions of acrylonitrile polymers and in articles produced from such solutions. An additional object relates to the production of solutions of acrylonitrile polymers and articles produced therefrom having improved color characteristics. Other objects will appear hereinafter.

This invention exhibits particular utility in connection with acrylonitrile polymers and will be described most particularly with respect to these specific polymers. The principle of the invention may also be applied to polymers other than acrylonitrile polymers which develop undesirable color characteristics, particularly when in solution, in the presence of organic bases, e. g. organic amines such as dimethylamine and other aliphatic amines.

The objects of the invention are accomplished in general by dissolving acrylonitrile polymers in dimethyl formamide and inhibiting color formation by the presence in said solution of a chemical compound which will react with amines, the solution containing the color inhibiting agent being subsequently converted, with removal of solvent, to a shaped article such as filaments, yarns, films and the like. The inhibiting agent permits prolonged standing of the solution or exposure to high temperature for considerable periods of time without the development of the high degree of objectionable color incident to the dissolving of said polymers in dimethyl formamide.

The following examples which are illustrative rather than limitative and in which parts, proportions and percentages are by weight unless otherwise specified describe preferred applications of the principles of the invention.

EXAMPLE

Separate solutions are made up by adding to 45 grams of dimethyl formamide the amounts of compounds (termed adjuvants) listed in the following tables, then adding 5 grams of polyacrylonitrile and allowing the mixture to stand with intermittent stirring at a temperature of 30° C., usually for a period of twenty hours, until complete solution of the polymer takes place. The solutions so formed are then exposed at the temperatures and for the periods of time set forth in the following tables and are then subjected to photelometer readings as in Tables I, II, III and V (the photelometer measuring the per cent of polychromatic light transmitted through the solutions) and to spectrophotometer readings as in Table IV (the spectrophotometer measuring the per cent of transmission through the solution, of light of different wave lengths); the readings in Table VI are based on visual observation without reliance on light measuring instruments. The measured percentages of transmitted light for the solutions containing the adjuvants listed in the tables which act as color inhibitors are compared with the measured percentage of transmitted light of a control which consists of 5 grams of polymer dissolved in 45 grams of dimethyl formamide to which no adjuvant has been added, but which is otherwise prepared in the same way as the solutions containing the adjuvants. The photelometer, spectrophotometer and visual readings were taken after exposures for the times and temperatures indicated in the following tables, the succeeding columns in the tables representing exposures in addition to the exposures indicated in the preceding columns.

Table I

|  | Amount Added, Grams | Photelometer Readings | |
|---|---|---|---|
|  |  | 20 hrs. at 25° C. | 1 hr. additional at 125° C. followed by 48 hrs. at 25° C. |
| Succinic anhydride | 0.11 | 80 | 70 |
| Phthalic anhydride | 0.11 | 84 | 45 |
| p-Toluene sulfonyl chloride | 0.11 | 77 | 57 |
| Trioxymethylene | 0.11 | 37 | 52 |
| Control; no adjuvant |  | 59 | 41 |

In the above table, the reading after twenty hours at 25° C. for trioxymethylene, namely 37, is somewhat low because the solution is turbid at 25° C., but becomes clear after heating at 125° C., as is evident from the figure of 52 given for one hour at 125° C., followed by forty-eight hours at 25° C.

It will be noted in the above table that a definite improvement is shown in the case of solutions containing the said adjuvants as compared with the control solution.

Table II

|  | Amount Added, Grams | Photelometer Readings | | |
|---|---|---|---|---|
|  |  | 20 hrs. at 25° C. | 1 hr. additional at 140° C. | |
|  |  |  | Measured after the 1 hr. exposure at 140° C. | Measured after 20 hrs. additional at 25° C. |
| Succinic anhydride | 0.36 | 78 | 50 | 58 |
| Phthalic anhydride | 0.36 | 80 | 29 | 38 |
| Control; no adjuvant |  | 53 | 30 | 28 |

The experiments shown in Table II illustrate the improvement obtained by permitting the solutions to rest for a considerable period of time after heating.

Table III

|  | Amount Added, Grams | Photelometer Readings | | |
|---|---|---|---|---|
|  |  | 20 hrs. at 25° C. | 5.5 hrs. additional at 100° C. Measured after 1 hr. | 24 hrs. additional at 65° C. and resting 1 wk. before measuring |
| Control; no adjuvant |  |  | 20.8 | 23.2 |
| Isobutyraldehyde | 0.135 |  | 28.5 | 41.6 |
| Cyclohexanone | 0.135 |  | 22.5 | 26.9 |
| Dimethylamine | 0.15 | 43.2 | [1] 3.0 |  |

[1] After 4.5 hours.

The above table illustrates the improvement effected by permitting the solutions to rest for a considerable period of time after heating. The use of dimethylamine in the fourth line of the above table shows the adverse effect of this material on color. Titration curves show that the dimethyl formamide used throughout the examples of this application contains basic impurities which were assumed to be dimethylamine.

Table IV.—*Effect of organic and inorganic acids on color of polyacrylonitrile solutions*

[Spectrophotometer Readings—Per Cent Light Transmitted]

| Wave Length of Light λ | Solvent Dimethyl-Formamide | Readings after heating 1 hr. at 120° C. | | |
|---|---|---|---|---|
|  |  | Control; No Adjuvant | Solution Containing Vinyl sulfonic acid | Solution Containing Sulfuric Acid |
| 6,000 | 100 | 87 | 97 | 97 |
| 5,500 | 100 | 81 | 95 | 96 |
| 5,000 | 100 | 72 | 90 | 91 |
| 4,500 | 100 | 55 | 78 | 79 |
| 4,000 | 100 | 30 | 62 | 62 |

In the preceding table, 0.25 gram of the adjuvant, namely vinyl sulfonic (ethylene sulfonic acid) or sulfuric acid, was dissolved in the dimethyl formamide before dissolving the acrylonitrile polymer therein.

Table V

| Adjuvant | Mols | Per Cent on Polymer [1] | Photelometer Readings | | | |
|---|---|---|---|---|---|---|
|  |  |  | 21 hr. standing | 1 hr. 140° 1 hr standing | 2 additional hrs. 140° 1 hr. standing | 20 hrs. standing |
| Control; no adjuvant |  |  | 50 | 33 | 17 | 17 |
| Succinic anhydride | 0.001 | 0.20 | 73 | 64 | 28 | 30 |
| Oxalic acid | 0.0001 | 0.018 | [2] 59 | [2] 53 | [2] 32 | [2] 32 |
| Boron trifluoride | 0.0015 | 0.204 | 75 | 64 | 32 | 36 |

[1] Signifies adjuvant in per cent by weight of polymer in solution.
[2] Solutions slightly turbid.

Although the above example and tables are directed to the use of dimethyl formamide as the solvent for the polymer, other solvents which either contain organic amine bases or develop them on standing or on heating will cause undesirable color formation. The following table shows the effect of solvent on color of solutions, the solutions, although termed unheated, being actually heated for a few minutes if necessary to bring about solubility of the polymer. The readings are purely relative and based on visual observation without the use of light measuring instruments, increasing numerical values connoting increased color of solutions.

Table VI

| Solvents | Solvent Alone | | Solutions Containing 10% Polyacrylonitrile | |
|---|---|---|---|---|
| | Before Heating | After heating at 115° for 2 hrs. | Before Heating | After heating at 115° for 20 hrs. |
| Dimethylformamide | 0 | 0 | 2 | 5–6 |
| Succinonitrile | 1 | 1 | 2 | 3 |
| N-Formyl morpholine | 0 | ½ | 3 | 5–6 |

The invention effects improvement in color characteristics in all solutions (and articles produced therefrom) of acrylonitrile polymers including not only polyacrylonitrile, but also acrylonitrile copolymers and interpolymers, particularly those containing at least 85% by weight of acrylonitrile in the polymer molecule, in which organic amines are introduced as impurities or are developed either on standing or on heating. N-formyl morpholine, like dimethyl formamide, generates amines on severe heating and such compounds are included within the spirit of the invention. Other such solvents for acrylonitrile polymers which develop amines, or which may contain them as impurities are the following: N,N-dimethyl methoxyacetamide, N-formyl hexamethylene imine, N-formyl pyrollidine and the like. The amine which causes the development of the undesirable color may be substantially colorless in itself, as in the case of dimethylamine for example.

The invention includes the use of substantially color free aldehydes, ketones, organic and inorganic acids, anhydrides, organic acid halides, boron trifluoride, and all other materials which are substantially colorless and which will react with amines to form substantially color free materials, the invention also including the use of chemical compounds which, under the conditions prevailing, liberate substances capable of reacting with amines to form substantially color free products. In addition to those compounds (adjuvants) specifically referred to above, sodium paratoluene sulfonate may also be used in the practice of the invention.

It has been shown in the above examples that color formation in solutions of acrylonitrile polymer can be greatly diminished by the addition of amine-binding compounds, i. e. compounds which will react with amines. The improvement in the solutions occurs to the same extent in shaped articles formed from the solutions since such articles acquire, at least in part, the color characteristics of the solutions from which they are formed when the impurities, as in the present case, are not removed during the formation of the shaped articles. Thus, the present invention also makes possible the production of filaments, yarns, films, tubing, sponges, sheeting, coatings and other forms of articles having greatly improved color. Such articles may be made by a so-called dry or evaporative process, as in the case of filaments and films, in which process the solvent is removed by evaporation, or a wet process in which the solvent is removed upon extrusion or the like of the polymer-containing solution into a coagulating bath composed of a coagulant in which the solvent, but not the polymer is miscible; suitable coagulants for wet processes are glycerin, 30% to 50% calcium chloride solutions, water, alcohol and concentrated aqueous solutions of other inorganic salts.

With respect to dimethyl formamide and some other solvents for acrylonitrile polymer, it is extremely difficult in many cases to remove the small quantities of organic amines present in the solvent and it is furthermore especially difficult to prevent the formation of small amounts of organic amines upon heating to elevated temperatures, of the order of 125° C. and upwards, such temperatures being frequently necessary to obtain a proper solution of the polymer or to impart to the solution the proper viscosity and other properties necessary for the formation of commercial articles. The present invention makes possible the commercial use of such materials and solutions without the undesirable color formation which would normally be incident to their use.

While the invention is of great utility when applied to polyacrylonitrile, i. e. polymerized vinyl cyanide [$(CH_2=CHCN)_x$], it is especially applicable to other acrylonitrile polymers in which at least 85% by weight of the polymer is acrylonitrile, such polymers including copolymers and interpolymers in which at least 85% by weight of the polymer is the acrylonitrile unit which is considered to be present in the polymer molecule as

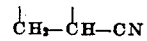

i. e. at least 85% by weight of the reactant material converted into and forming the polymer is acrylonitrile.

The polyacrylonitrile polymer preferred for use in the practice of the present invention is preferably prepared by the ammonium persulfate catalyzed polymerization of monomeric acrylonitrile dissolved or emulsified in water. It can however be prepared by any other suitable type of polymerization reaction, such as for example the emulsion type reaction disclosed by United States Patent No. 2,160,054 to Bauer et al. The polymer preferably possesses a molecular weight within the range 15,000 to 250,000 or even higher, as calculated from viscosity measurements by the Staudinger equation:

$$\text{Molecular weight} = \frac{N_{sp}}{K_m C}$$

wherein:

$K_m = 1.5 \times 10^{-4}$ $N_{sp} = \text{specific viscosity} = \dfrac{\text{viscosity of solution}}{\text{viscosity of solvent}} - 1$, and $C$ = concentration of the polymer expressed as the number of moles of the monomer (calculated) per liter of solution.

The molecular weight of the polymer obtained is dependent on such factors as the concentration of the monomer in the water, the amount and type of catalyst present, the temperature of the reaction, etc. When the monomer is present in 5% aqueous solution maintained at a temperature of from 3° to 5° C., it is found that the use of 4% of ammonium persulfate catalyst (based on the weight of the acrylonitrile) results in the formation of a polymer having a molecular weight (as calculated by the above equation) of approximately 60,000. Increasing or decreasing the amount of the catalyst, while maintaining the other conditions constant, decreases or increases the molecular weight of the polymer. Acrylonitrile copolymers and interpolymers containing at least 85% by weight of acrylonitrile in the polymer molecule can be prepared in a similar manner.

Although the acrylonitrile polymers containing at least 85% by weight of acrylonitrile polymers are preferred in the practice of this invention, the invention may be applied to polymers containing lower percentages of acrylonitrile in the polymer molecule. Color formation likewise occurs in the preparation of solutions of other types of polymers due to the presence of organic bases which may, in some cases, be formed by the use of high temperatures and the invention contemplates the diminution of color in such polymers by the use of compounds such as are described herein which will react with amines to give substantially color free reaction products.

It is preferred that the amine-binding substance or adjuvant be added to the polymer solvent prior to adding the polymer since, in this embodiment, any amines present in the solvent will be removed as color-imparting agents and since, in addition, any color that might be developed, as by heating, will be removed at the moment of its formation. However, the amine-binding compounds may be added during or after the dissolution of the polymer in the solvent. It is preferred that the adjuvants of the present invention be present in a small amount compared with the amount of polymer dissolved. Thus, although the amount is not critical, it is preferred that the adjuvant or amine-binding compound be present in the amount of 0.1% to 10% based on the weight of the polymer although in most instances an amount from 1% to 5% will be most effective.

Any departure from the specific disclosure contained herein which conforms to the spirit of the invention is intended to be included within the scope of the claims.

I claim:

1. A solution comprising polyacrylonitrile, dimethyl formamide and from 0.1% to 10%, based on the weight of polyacrylonitrile, of a color free acidic compound from the group consisting of organic acids, inorganic acids, anhydrides and organic acid halides, said solution being stable at a temperature of 140° C.

2. A solution comprising polyacrylonitrile, dimethyl formamide and from 0.1% to 10%, based on the weight of polyacrylonitrile, of a color free acid, said solution being stable at a temperature of 140° C.

3. A solution comprising polyacrylonitrile, dimethyl formamide and from 0.1% to 10%, based on the weight of polyacrylonitrile, of a color free organic acid, said solution being stable at a temperature of 140° C.

4. A solution comprising polyacrylonitrile, dimethyl formamide and from 0.1% to 10%, based on the weight of polyacrylonitrile, of a color free organic anhydride, said solution being stable at a temperature of 140° C.

5. A solution comprising polyacrylonitrile, dimethyl formamide and succinic anhydride, said solution being stable at a temperature of 140° C.

6. A solution comprising polyacrylonitrile, a solvent for polyacrylonitrile which generates an organic amine upon heating to a temperature of 125° C. and upwards, and from 0.1% to 10%, based on the weight of polyacrylonitrile, of a color free acidic compound from the group consisting of organic acids, inorganic acids, anhydrides and organic acid halides, said solution being stable at a temperature of 140° C.

ROBERT ALBERT SCHEIDERBAUER.

REFERENCES CITED

The following references are of record in the file of this patent:

UNITED STATES PATENTS

| Number | Name | Date |
|---|---|---|
| 1,975,179 | Smith | Oct. 2, 1934 |
| 2,404,728 | Finzel | July 23, 1946 |